United States Patent

Macovski

[15] 3,649,754
[45] Mar. 14, 1972

[54] REAL TIME INTERFEROMETRY UTILIZING A TELEVISION SYSTEM

[72] Inventor: Albert Macovski, Palo Alto, Calif.
[73] Assignee: Stanford Research Institute, Menlo Park, Calif.
[22] Filed: Apr. 20, 1970
[21] Appl. No.: 30,074

[52] U.S. Cl. .............................................. 178/6.8, 350/3.5
[51] Int. Cl. ......................................................... H04n 7/18
[58] Field of Search ................ 350/3.5; 178/DIG. 3, DIG. 33

[56] References Cited

UNITED STATES PATENTS

| 3,423,526 | 1/1969 | Law | 178/DIG. 3 |
| 3,336,585 | 8/1967 | Macouski | 178/DIG. 33 |
| 3,531,589 | 9/1970 | Collier | 350/3.5 |
| 3,541,252 | 11/1970 | Collier | 350/3.5 |

OTHER PUBLICATIONS

Brooks— New Dimension To Interferometry— Electronics Vol. 40, No. 10, May 1967, pp. 88– 93

Primary Examiner—Robert L. Griffin
Assistant Examiner—Joseph A. Orsino, Jr.
Attorney—Urban H. Faubion

[57] ABSTRACT

A real time holographic interferometer is disclosed. Two interference patterns of an object, one without stressing of the object and one with such stressing, are produced using holographic techniques. The interference patterns form visual inputs to a television camera which converts them into electrical signals. These electrical signals are combined to produce an output which contains information relative to position deformities of the object between the unstressed and stressed states and the position deformity information is displayed on an appropriate display device.

28 Claims, 8 Drawing Figures

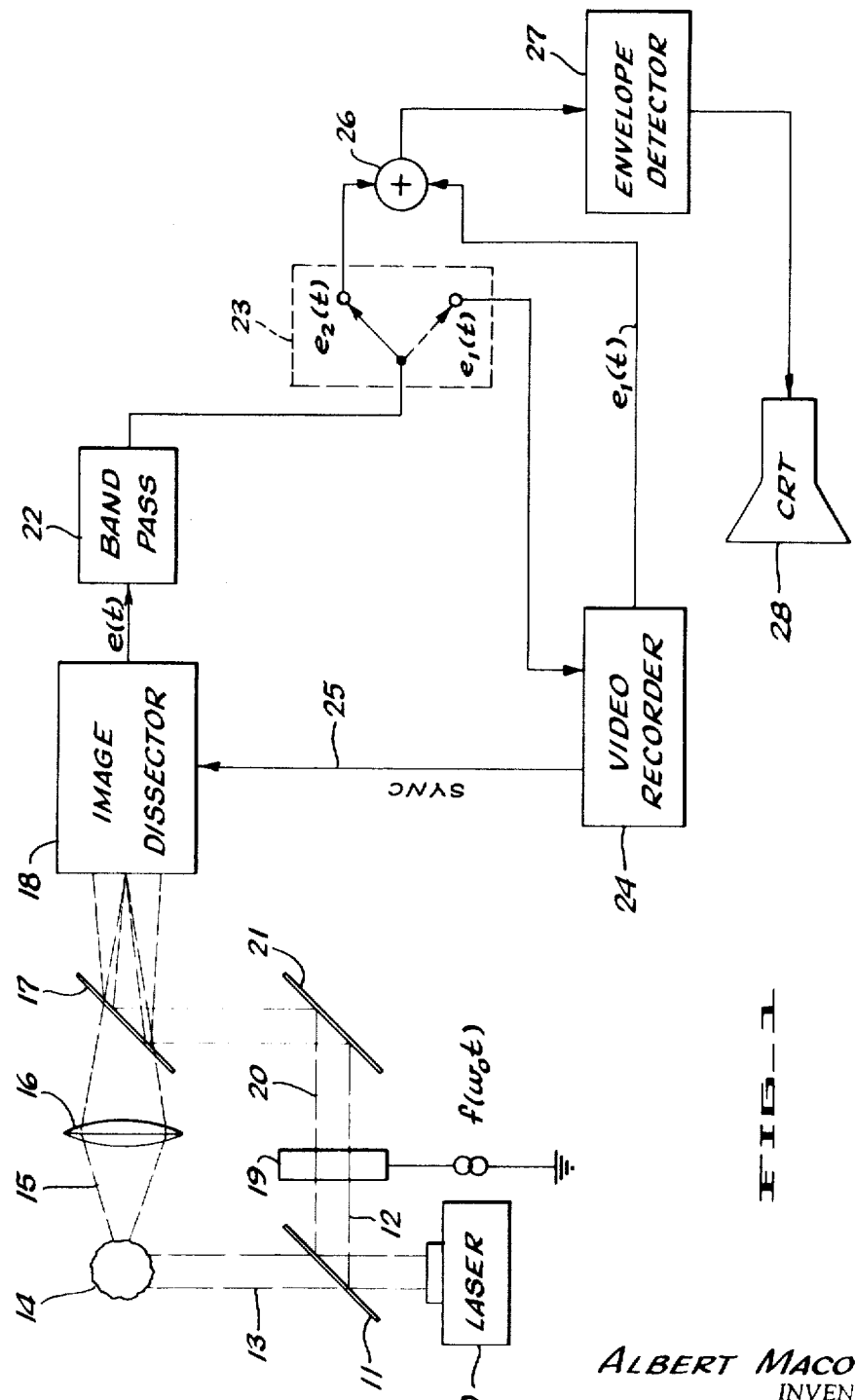

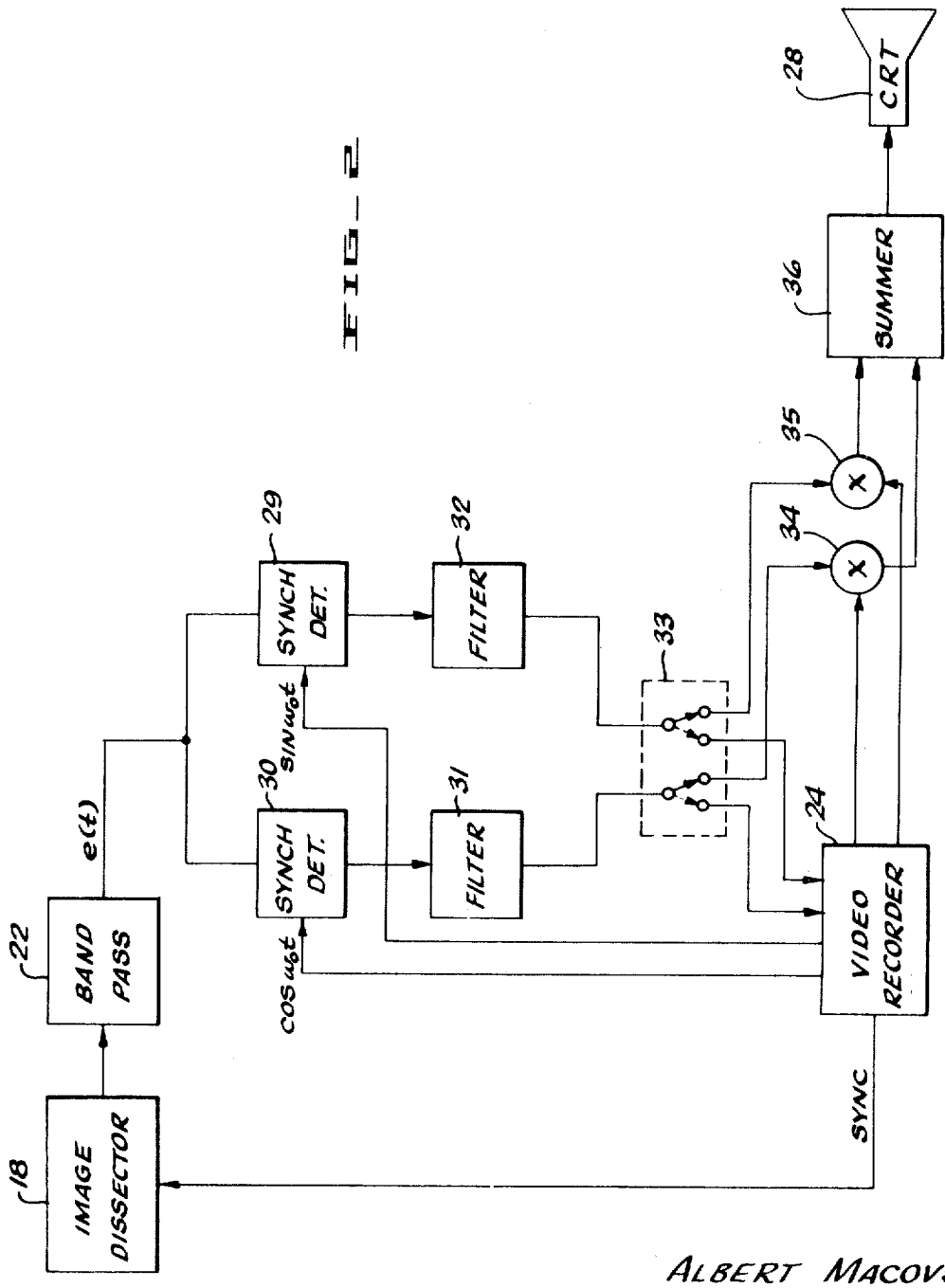

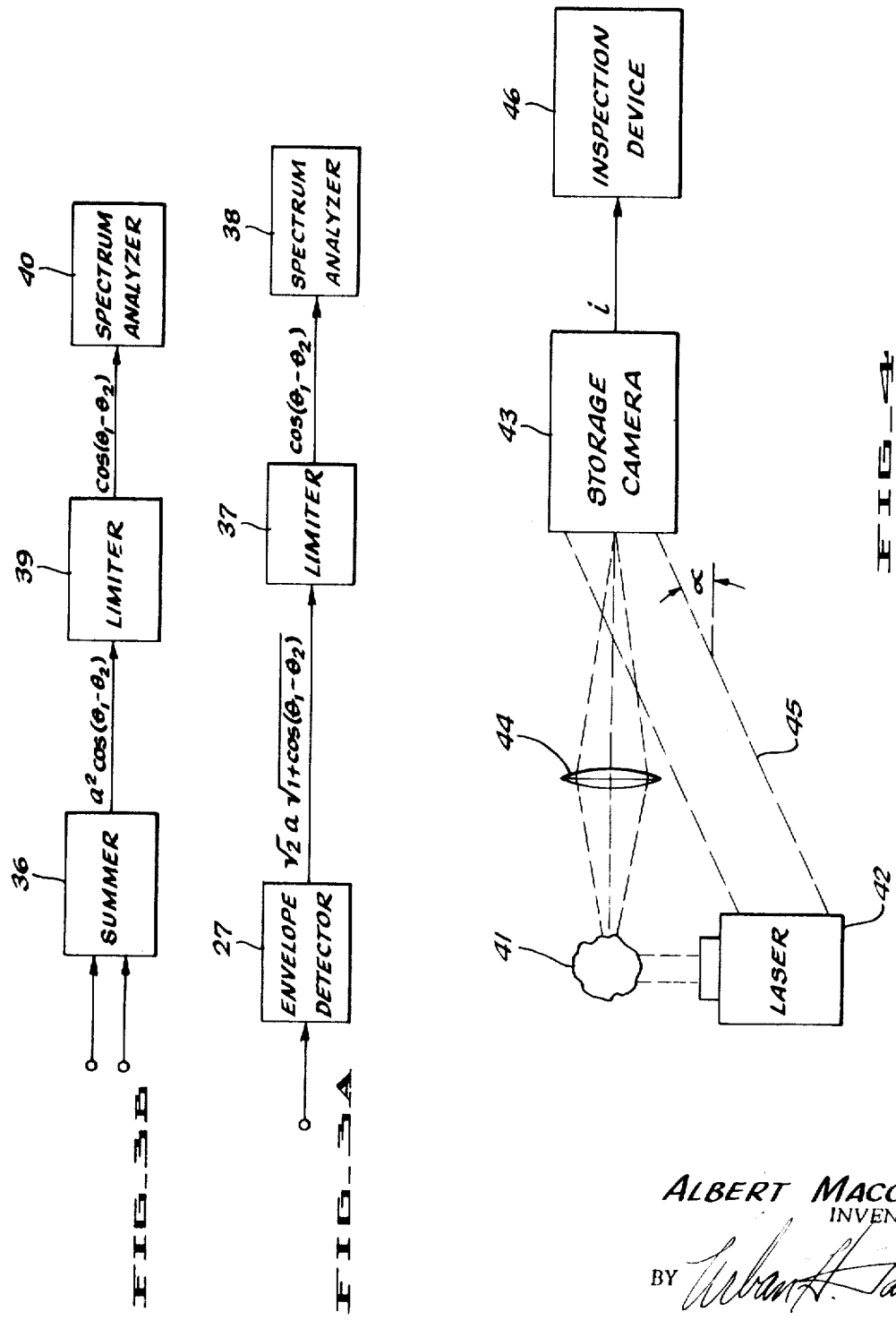

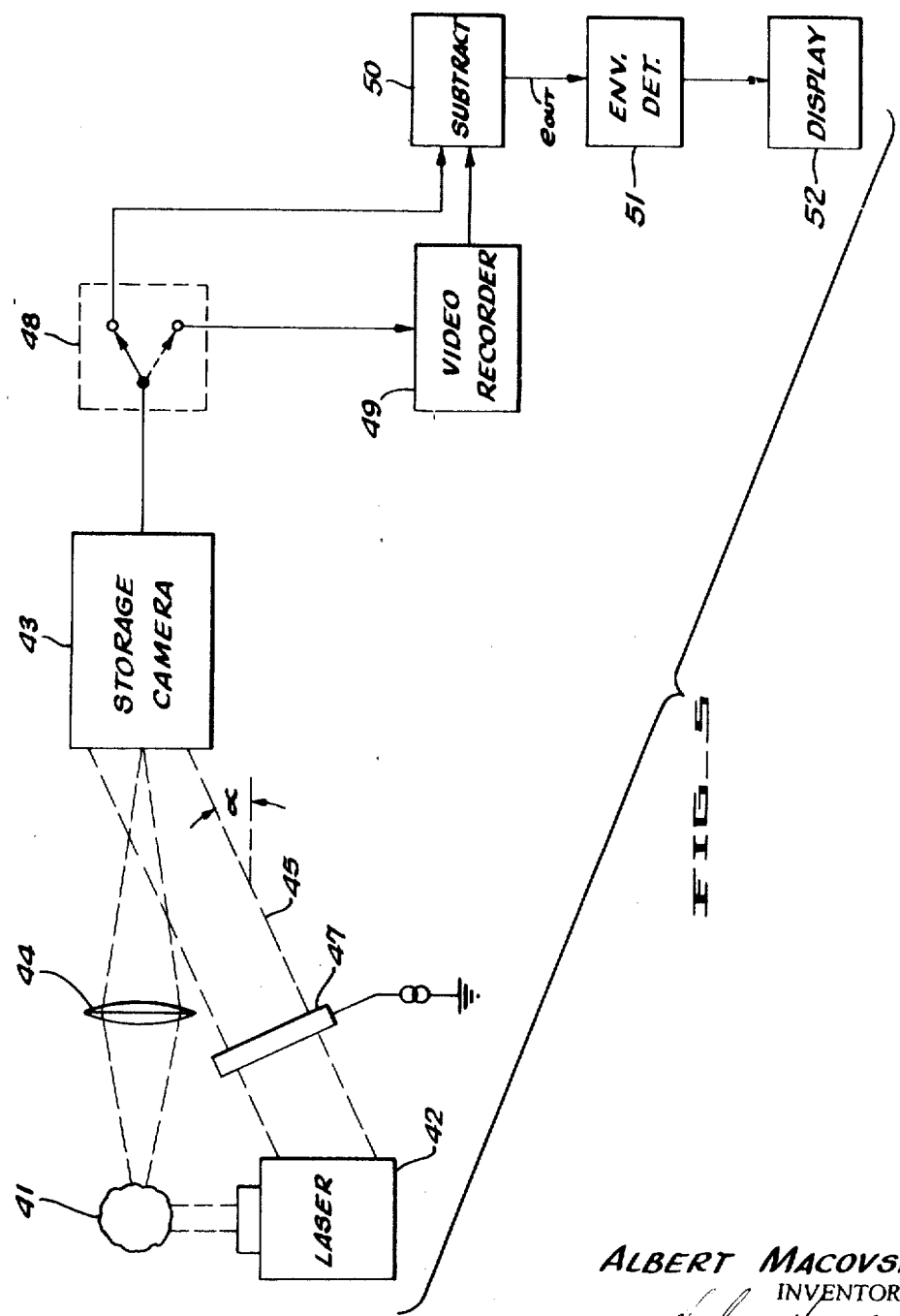

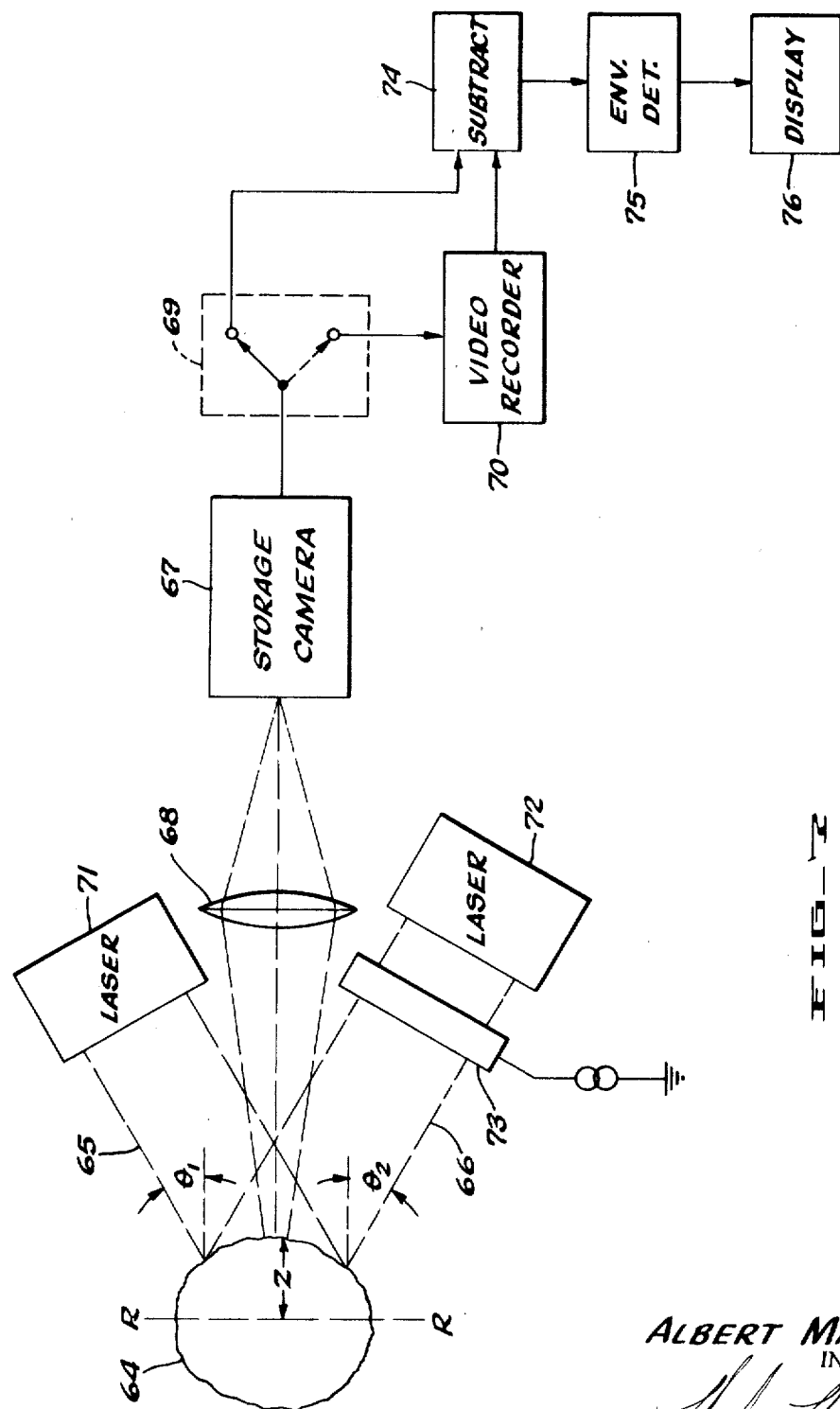

3,649,754

REAL TIME INTERFEROMETRY UTILIZING A TELEVISION SYSTEM

REFERENCES TO RELATED APPLICATIONS

This application is related to and uses some of the techniques described in "Scanned Holography Systems Using Temporal Modulation," Ser. No. 781,842, filed Dec. 6, 1968, and assigned to the assignee of the present invention.

BACKGROUND OF THE INVENTION

1. Field of the Invention

This invention relates to hologram interferometry and more particularly to real time hologram interferometry for measuring small dimensional changes in an object.

2. Description of the Prior Art

A holographic system is one wherein light diffracted by an object or reflected by an object is presented with a reference wave to produce a complex light interference pattern that contains information about both the amplitude and phase of the light diffracted or reflected from the object. The interference pattern may be recorded even on photographic film which responds only to intensity and the recorded interference pattern is called a hologram. By directing light having a frequency content substantially corresponding to that of the light diffracted or reflected by the original object through the recorded interference pattern, an image of the original object can be obtained.

The earliest means of recording and reconstructing holograms were called on-axis systems and had the advantage that the photographic film used to record the information about the amplitude and phase of the diffracted waves could be a low resolution film. However, this early system had the disadvantage that it was extremely difficult to separate the desired image from interfering light and other images in the reconstructed wave.

In an effort to separate meaningful images from background noise in a holographic system an off-axis system was developed. In this system the recording plane receives light from the object and the reference waves from different locations. The frequency of the interference fringes which must be recorded on the hologram is increased as a function of the angle between the interfering waves. Thus, it is necessary to utilize a recording medium (photographic film, for example) which has a much higher resolution than is necessary to make the same recording using an on-axis holographic system.

A considerable amount of work is presently being done in a type of hologram interferometry for measuring small dimensional changes in an object. For example, this is done in searching for defects in automobile tires. A first hologram is made of the object, such as the tire. The object is then altered or stressed in some specific way; for example, the tire pressure is increased. A second hologram is then made of the object in the stressed condition, and the first and second holograms are superimposed. The interference fringes in the final reconstruction of the developed hologram transparency indicate the amount of movement which has taken place in each area. In the case of the tire, excessive fringes in a local area is indicative of a defect. This method of hologram interferometry, however, requires the awkward wet processing of photographic film. In addition, very high resolution emulsions are required since, as in conventional holography, the reference is introduced at an angle in order to eliminate undesired components.

SUMMARY OF THE INVENTION

It is an object of this invention to measure small dimensional changes in an object by real time hologram interferometry. Briefly, in accordance with one embodiment of the invention, real time interferometry is achieved by imaging two interference patterns of an object, one without stressing of the object and one with such stressing, on a television camera. The output of the television camera for the two interference patterns are combined to produce a display of position deformation of the object between the unstressed and stressed states. Since an image hologram is used instead of a Fresnel or Fourier transform hologram, no transparency is required in order to perform a readout.

BRIEF DESCRIPTION OF THE DRAWINGS

The novel features which are believed characteristic of the invention are set forth with particularity in the appended claims. The invention itself, however, both as to its organization and method of operation, together with further objects and advantages thereof, may best be understood by reference to the following description taken in connection with the accompanying drawings in which:

FIG. 1 schematically shows one embodiment of a hologram real time interferometer which uses the basic principles of temporal offset holography;

FIG. 2 is similar to FIG. 1 but shows an interferometer in which the real and imaginary parts of a signal are separately processed;

FIGS. 3a and 3b show alternate display arrangements for the interferometers of FIGS. 1 and 2;

FIG. 4 shows an interferometer which utilizes a storage television camera and spatial offset of a reference beam with internal storage in the camera of two interference patterns before scanning;

FIG. 5 is similar to FIG. 4 except that each of two interference patterns on the storage camera are scanned with storage and processing external to the camera;

FIG. 7 shows an interferometer in which the interference pattern is produced on the object itself rather than on a television camera.

DESCRIPTION OF THE PREFERRED EMBODIMENTS

Figure 6:
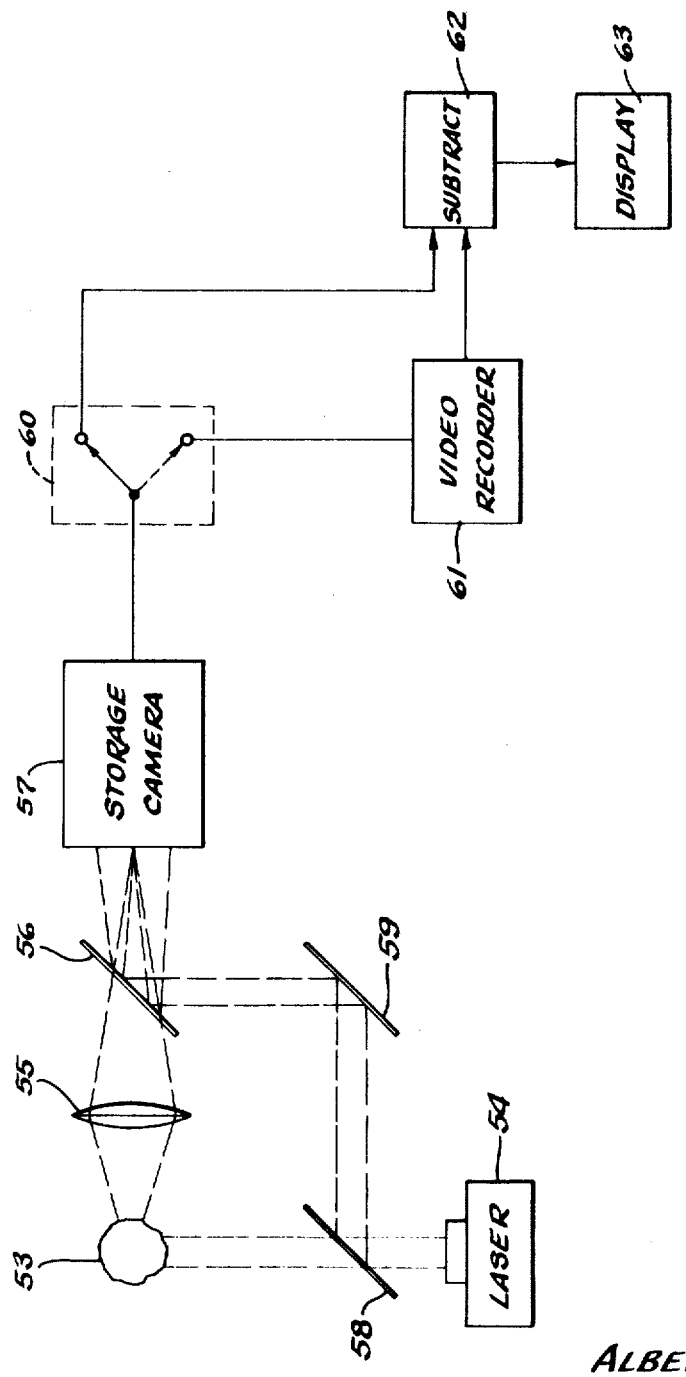
FIG. 6 shows an interferometer which requires neither temporal nor spatial offset of the reference beam but which can display only position deformation information.

Referring now to FIG. 1, there is shown one embodiment of the present invention which utilizes the basic principles of temporal offset holography as described in "Scanned Holography Systems Using Temporal Modulation," Ser. No. 781,842, filed Dec. 6, 1968; and assigned to the assignee of the present invention. In FIG. 1 light from a continuous laser 10 is split by a half-silvered mirror 11 into an object beam 12 and a reference beam 13. The object beam 12 illuminates an object 14 which is being inspected and the object 14 scatters and reflects the object beam 13 to form a scattered object beam 15. The scattered object beam 15 is focused by a lens 16 through a half-silvered mirror 17 onto the face of an image dissector 18.

In order to provide a cyclical temporal offset between the reference and object waves 12 and 13, a light frequency shifter 19 is inserted in the path of the reference beam 12. In this case the frequency shifter 19 constitutes a single sideband modulator which shifts the frequency of reference beam 12 by an amount $\omega_o$. The modulated reference beam 20 is recombined with light from the scattered and reflected object beam 15 by an arrangement of mirrors. That is, a mirror 21 is positioned in the path of the modulated reference beam 20 at an angle of 45° relative to its axis (parallel to the plane of beam splitter 11) thus reflecting the modulated reference beam 20 at an angle of 90° (upward in the drawing) to the beam splitter 17 placed at a 45° angle to the path of the modulated reference beam 20 (parallel to both beam splitter 11 and mirror 21) in such a manner that it combines the modulated reference beam 20 and the scattered and reflected object beam 15. In this embodiment, the final mirror for combining the two beams is a beam splitter, because the modulated reference beam 20 must be brought to the face of the image dissector 18 on-axis with the center of the scattered and reflected object beam 15 in order to form the desired interference pattern. The on-axis arrangement effectively minimizes spatial frequencies at the interference plane or face of the image dissector 18.

The interference between the scattered and reflected object beam 15 and the modulated reference beam 20 ($e^{j\omega_0 t}$) are applied to the image dissector 18 which measures the instantaneous intensity while scanning.

The intensity of the light scattered from the object is given by $$U = a_1(x,y) e^{j\theta_1(x, y)}$$

and the intensity of the reference wave may be expressed as $$R = e^{j\omega_0 t}$$

Thus the sum of the two beams in the interference pattern at the face of the image dissector 18 is given by $$I_1 = |U + e^{j\omega_0 t}|_2$$
$$= 1 + a_1^2 + 2a_1\cos[\theta_1 - \omega_0 t]$$

The output $e(t)$ of the image dissector 18 is proportional to the intensity $I_1$. The output $e(t)$ is filtered by a bandpass filter 22 so that the output of the bandpass filter 22 contains only the time varying signal $$e_1(t) = a_1 \cos[\theta_1 - \omega_0 t]$$

The signal $e_1(t)$ is applied through a switch 23 which at this time is in a position shown by the dotted lines to a video recorder 24 where it is recorded.

In a second exposure, the object 14 is distorted or stressed in some particular manner; for example, if the object were a tire the pressure could be increased. A second image is produced on the image dissector 18 having an associated intensity $I_2$. The synchronization between the stored image resulting from the first exposure or scan which is stored on the video recorder and the second exposure or scan must be carefully maintained. One method of insuring such synchronism is, on the second scan, to derive the camera synchronizing signals from the sync signal recorded on the video recorder during the first scan. This is illustrated in FIG. 1 by a connection 25 between the video recorder 24 and the image dissector 18. Alternatively, a sync signal may be recorded on a separate track of the video recorder 24 and this sync signal used for both the first and second scans. With either approach synchronization is maintained between the first and second scan and for the second scan the output of bandpass filter 22 is given by $$e_2(t) = a_2 \cos[\theta_2 - \omega_0 t]$$

The switch 23 is placed in the position shown by the solid line in FIG. 1 during the second scan and the signal $e_2(t)$ is applied to a summer 26. Simultaneously, the signal $e_1(t)$ which was recorded on video recorder 24 during the first scan is also applied to the summer 26 during the time of the second scan so that $e_1(t)$ and $e_2(t)$ are added together by the summer 26. The output of the summer 26 is an envelope detected by an envelope detector 27.

In general, the changes in the object 14 due to being stressed or altered will be very small in size so that the amplitude of the image in each case, $a_1$ and $a_2$, will be essentially the same. The only significant change takes place in the phase where $\Delta\theta = k\Delta z$, where $\Delta z$ is the change in the z position of the object and $k$ is the wave number $2\pi/\lambda$. Thus, for purposes of simplifying the mathematics involved, it can be said that $a_1 = a_2 = a$. It should be noted that this assumption is not essential. The analysis would be equally valid if it were not made and it is made only to simplify the mathematics involved. Then the resultant envelope of the sum is given by $$\text{Envelope }[e_1(t) + e_2(t)] = \sqrt{2}\, a\, \sqrt{1 + \cos(\theta_1 - \theta_2)}$$

$$= \sqrt{2}\, a(x, y)\, \sqrt{1 + \cos k\Delta z(x, y)}$$

This signal is displayed on a cathode ray tube 28 showing the original image $a(x, y)$ modulated by an interference signal due to the position deformities of the object 14. Note that no spatial frequencies higher than that of the image ever have to be handled by the image dissector 18 or the output cathode ray tube 28. This system can be used for assembly line testing of a wide variety of products and any defects in the products show up as excessive fringes or interference in a local area on the cathode ray tube 28.

One of the difficulties of the system just described in connection with FIG. 1 is that the video recorder is required to store and reproduce the offset carrier frequency $\omega_0$, with good phase accuracy. This not only requires increased frequency response of the video recorder, but also might necessitate minimizing the wow and flutter beyond that normally required. This requirement can be eliminated by an arrangement such as that shown in FIG. 2 in which the real and imaginary parts of the signal are stored on two separate tracks of a video recorder rather than storing the carrier signal itself.

Referring now to FIG. 2, only the electronics for this system is illustrated with like reference numerals applied to elements common with the arrangement of FIG. 1. The optics arrangement for producing an interference pattern on the image dissector 18 is the same as that shown for FIG. 1 and is not shown in FIG. 2. In FIG. 2 an image dissector 18 and a bandpass filter 22 operate in the same manner as described in connection with FIG. 1 to produce a signal $e_1(t)$ during a first scan and a signal $e_2(t)$ during a second scan. During the first scan the signal $e_1(t) = a_1 \cos[\theta_1 - \omega_0 t]$ from the bandpass filter 22 is applied to synchronous detectors 29 and 30. Synchronous detector 29 multiplies $e_1(t)$ with $\sin \omega_0 t$ and synchronous detector 30 multiplies $e_1(t)$ with $\cos \omega_0 t$. The signals $\sin \omega_0 t$ and $\cos \omega_0 t$ may be obtained in any convenient manner and are shown in FIG. 2 as being obtained from prerecorded tracks on video recorder 24. The output of synchronous detector 30 is given by $(\cos \omega_0 t)(a_1 \cos[\theta_1 - \omega_0 t])$
$= a_1(\cos \theta_1 \cos^2 \omega_0 t + \sin \theta_1 \sin \omega_0 t \cos \omega_0 t)$
$= a_1[\cos\theta_1(\tfrac{1}{2} + \cos 2\omega_0 t) + \sin \theta_1(\sin 2\omega_0 t)]$ This signal is then filtered by a low pass filter 31, which filters the second harmonic of $\omega_0$. The output of low pass filter 31 is then given by $\tfrac{1}{2} a_1 \cos \theta_1$.

In a similar manner, the signal $e_1(t)$ is multiplied with $\sin \omega_0 t$ in synchronous detector 29 and filtered by a low pass filter 32. The output of low pass filter 32 may be expressed as $\tfrac{1}{2} a_1 \sin \theta_1$.

The signals $\tfrac{1}{2} a_1 \cos \theta_1$ and $\tfrac{1}{2} a_1 \sin \theta_1$ are applied through a switch 33 to the video recorder 24 where they are stored.

During a second scan, after the object under examination has been distorted as discussed before in connection with FIG. 1, the same synchronous detector 29 and 30 and low pass filters 31 and 32 are used to develop $a_2 \cos \theta_2$ and $a_2 \sin \theta_2$. In the arrangement of FIG. 2, the image dissector synchronizing signals are derived in the same manner as discussed before in connection with FIG. 1; that is, either both the first and second scans are synchronized to a sync signal recorded on video recorder 24 or the second scan is synchronized to a sync signal recorded on video recorder 24 during the first scan. As discussed before, the changes in the object due to being stressed or altered will be very small in size so that the amplitude of the image in each case, $a_1$ and $a_2$, will be essentially the same. The only significant change takes place in the phase where $\Delta\theta = k\Delta z$, where $\Delta z$ is the change in the $z$ position of the object and $k$ is the wave number $2\pi/\lambda$. Thus, for purposes of simplifying the mathematics involved, it can be said that $a_1 = a_2 = a$. The signals stored during the first scan, a $\cos \theta_1$ and a $\sin \theta_1$, are combined with the signals developed during the second scan, a $\cos \theta_2$ and a $\sin \theta_2$, during the time of the second scan by product devices 34 and 35, which may be any of the well-known devices in the art for multiplying two signals together. The output of product device 34 is a $\cos \theta_1$ a $\cos \theta_2$ and the output of product device 35 is a $\sin \theta_1$ a $\sin \theta_2$. These two outputs are added together in a summer 36 to yield a signal described by $a \cos \theta_1\, a \cos \theta_2 + a \sin \theta_1\, a \sin \theta_2 = a^2 \cos(\theta_1 - \theta_2)$ This signal can be applied directly to a cathode ray tube 28 as shown in FIG. 2 to directly indicate the areas of deformation by fringe density. An alternative to displaying the information is to automatically measure the deformation so as to reject those products which fall outside of a predetermined limit.

Referring now to FIGS. 3a and 3b, there is diagrammatically shown circuits for automatically measuring the deformation so as to reject those products which fall outside of a predetermined limit. In FIG. 3a (which corresponds to the interferometer arrangement of FIG. 1) the output of the envelope detector 27 instead of being applied to a cathode-ray tube is applied to a limiter 37 which removes the amplitude information, leaving a signal cos $(\theta_1 - \theta_2)$. Alternatively, the signals themselves, $e_1(t)$ and $e_2(t)$ can be limited rather than the envelope detected signal. Suitable limiters are well known in the art and hence are not discussed here. The output of limiter 37 is applied to a spectrum analyzer 38. If the scan is in the $x$ direction, the resultant frequency directly indicates the $z$ deformity in the $x$ direction, which can be expressed as $$(\theta_1 - \theta_2) = k\Delta z(x,y)$$

$$\frac{\partial(\theta_1 - \theta_2)}{\partial x} = \frac{k\partial \Delta z}{\partial x}$$

The spectrum analyzer 38 which may, for example, be a frequency discriminator, is used to indicate the degree of deformation.

In a similar manner, the arrangement of FIG. 3b, which corresponds to the interferometer of FIG. 2, comprises a limiter 39 to which the output of summer 36 is applied, and a spectrum analyzer 40 for indicating the degree of deformation. It might be helpful to also scan in the $y$ direction for either of the arrangements of FIGS. 3a and 3b to provide $\partial \Delta z/\partial y$. However, for local deformations which produce circular interference patterns, a one-dimensional scan as provided by a conventional raster is sufficient. In a production line setting, equipment for automatically accepting or rejecting products (not shown) can be controlled by spectrum analyzer 38 or spectrum analyzer 40. Thus when the degree of deformation of a stressed product is beyond a certain limit, indicating a defect, the product can be automatically rejected.

Still another approach to real time interferometry in accordance with the principles of this invention is shown in FIG. 4. In FIG. 4 an object 41 is illuminated by a laser 42 and the diffracted and reflected light from the object 41 is imaged on the face of a storage camera tube 43 by a lens 44. A storage camera tube has significantly better light sensitivity than that of an image dissector camera tube.

The storage camera tube 43 may be any storage-type television tube such as a vidicon or orthicon. Since these tubes cannot respond to rapidly varying intensities, spatial offset is used wherein a reference beam 45 from the laser 42 is incident on the storage camera 43 at some angle $\alpha$, with respect to the optical axis of the storage camera, where $\beta = \sin\alpha$. The intensity on the face of the storage camera 43 is given by $$I_1 = |U_1(x,y) + e^{jk\beta y}|^2$$

where $U_1(x,y)$ is the intensity of the diffracted and reflected light from object 41 which is given by $$U_1 = a(x,y)e^{j\theta_1(x,y)}.$$

Thus $$I_1 = 1 + |U_1|^2 + U_1 e^{-jk\beta y} + U_1^* e^{jk\beta y}$$

where * represents conjugate. Then, since $U_1 = a(x,y)e^{j\theta_1(x,y)}$ $$I_1 = 1 + a^2 + 2a \cos[\theta_1 - k\beta y]$$

As was the case in the interferometer arrangements of FIGS. 1 and 2, a second image is taken of the object 41 after it is stressed or altered in some appropriate manner. Then, $$I_2 = 1 + a^2 + 2a \cos[\theta_2 - k\beta y]$$

No scanning takes place while the successive images are being applied so that the intensities $I_1$ and $I_2$ are stored in storage tube 43. Assuming that storage tube 43 is a vidicon camera and that for a vidicon camera, the output current $i$ of the camera is given by $$i = [I_1 + I_2]^{1/2} = 2^{1/2}\{1 + a^2 + a[\cos(\theta_1 - k\beta y) + \cos(\theta_2 - k\beta y)]\}^{1/2}$$

Ignoring the constant $\sqrt{2}$ and expanding
$U_1 = a(x,y)e^{j(x,y)}$. Thus $I_1 = 1 + (a^3/4))[\cos(\theta_1 - k\beta y) + \cos(\theta_2 - k\beta y)]$
$+(a^2/16)[\cos 2(\theta_1 - k\beta y) + \cos 2(\theta_2 - k\beta y) + \cos(\theta_1 - \theta_2)$
$+ \cos \theta_1 + \theta_2 - 2k\beta y)] +$ higher order terms.

If the spatial frequency $k\beta$ is too high for the vidicon to resolve, as it will be for any reasonable value of angle $\alpha$, the camera output will only reproduce the lower frequency versions of this expression $$i = 1 + (a^4/8) + (9a^2/16) + (a^2/16) \cos(\theta_1 - \theta_2)$$

Thus a relatively large spatial offset is used so as to eliminate many of the undesired patterns and maintain the relatively low spatial frequency pattern corresponding to the desired deformation information $\cos \theta_1 - \theta_2$). The storage surface of the camera tube must be capable of resolving the high spatial frequency $k\beta$ due to the offset. However, the readout beam of the camera tube, which normally limits the resolution, is not required to resolve this high spatial frequency. Note that "$a$" is the ratio of object image amplitude on the camera faceplate to that of the reference. At an optimum value of $a = 1.68$ (a broad maximum), the peak-to-peak fringe amplitude is about 10 percent of the total, providing significant fringe contrast. Higher fringe contrast could be achieved by using more profound nonlinearities. For example, the vidicon 43 could be scanned at insufficient beam current, which effectively clips the higher intensity regions. This clipping type of nonlinearity would be a more efficient method of providing the desired mixing action. In addition, the "knee" of an image orthicon, if an image orthicon is used for storage camera 43, could be used. It is important to realize that only nonlinearities at the storage surface itself can be used. Nonlinearities applied to the electrical signal will not provide the desired effect since the high frequency signals do not exist at that point.

The inspection of the interference pattern between the first and second (stressed) images of the object 41 is made by an inspection device 46. The inspection can be made manually in which case inspection device 45 may be a cathode ray tube; or the inspection may be made automatically, in which case inspection device 45 may comprise a limiter to remove all of the signal information except $\cos(\theta_1 - \theta_2)$, and a spectrum analyzer to analyze $\cos(\theta_1 - \theta_2)$. In either case, since, when the storage camera 43 is scanned, the pattern will disappear in a few frames, the inspection has to be made in these few frames. Alternatively, inspection device 46 might include a storage device such as a video disc or storage tube so that the scanned signal could be stored for subsequent inspection.

An alternate approach to real time interferometry utilizing a storage camera is schematically illustrated in FIG. 5. The arrangement of FIG. 5 is similar to that of FIG. 4 and like reference numerals are applied to corresponding elements in the two figures. As before, an object 41 is illuminated with light from a laser 42 and the scattered and reflected light is imaged by a lens 44 on the face of a storage camera 43. A controlled phase shifter 47 is placed in the path of a reference beam 45 from laser 42, which is incident on the storage camera 43 at an angle $\alpha(\beta = \sin \alpha)$ with the optical axis of storage camera 43. In operation, the angle $\alpha$ that the reference beam makes with the optical axis of the storage camera 43 is made to be small enough that the spatial frequency $2\pi k\beta$ or $\sin \alpha/\lambda$ is within the resolution capability of the storage camera 43.

During a first scan in which the object 41 is unstressed no signal is applied to controlled phase shifter 47 and the resultant interference pattern on storage camera 43 is given by $$I_1 = 1 + a^2 + 2a \cos[\theta_1 - k\beta y]$$

and is coupled through a switch 48 (which at this time is in the position shown by the dotted arrow) to a video recorder 49 where it is recorded. Next, the object 41 is stressed or altered in some specific manner and another interference pattern is created on the face of the storage camera 43. During this time a signal is applied to the controlled phase shifter 47 which may for example be an electro-optic crystal so that the phase between the scattered and reflected light from the object 41 and the reference beam is shifted 180°. It is desirable for this approach that the laser 42 be a pulsed laser to insure that no undesired vibration disturbs the interference pattern. With the reference shifted 180° the output of the storage camera 43 is given by $$I_2 = 1 + a^2 - 2a \cos[\theta_2 - k\beta y]$$

At this time the switch 48 is in the position shown by the solid arrow and $I_2$ and $I_1$ (previously recorded on video recorder 49) are combined in a subtracter 50. The subtracter 50 subtracts $I_2$ from $I_1$ to give a signal $e_{out}$ which is expressed as $$e_{out} = 2a\,[\cos(\theta_1 - ky) + \cos(\theta_2 - k\beta y)]$$

The signal $e_{out}$ is envelope detected by an envelope detector 51. The signal $e_{out}$ may be expressed as $$e_{out} = 2a\,[\cos\theta_1\cos k\beta y + \sin\theta_1\sin k\beta y + \cos\theta_2\cos k\beta y + \sin\theta_2\sin k\beta y]$$

Then the envelope of $e_{out}$

Env. $e_{out} = (2a^2)^{1/2}\,[^{(\cos}\theta_1 + \cos\theta_2)^2 + (\sin\theta_1 + \sin\theta_2)^2]^{1/2} =$
$(2a^2)^{1/2}[2 + 2\cos\theta_1\cos\theta_2 + \sin\theta_1\sin\theta_2]^{1/2} = (2a^2)^{1/2}\,(2)^{1/2}$
$[(1\cos(\theta_1 - \theta_2)]^{1/2}$ Dropping the constants gives Env. $e_{out} = a\,[1 + \cos(\theta_1 - \theta_2)]^{1/2}$ This envelope is applied to a display 52. The envelope of this signal $e_{out}$ is the original picture "a" modulated by the interference pattern due to the phase variation (defect in the object). The display 52 may be a cathode-ray tube which is viewed by an operator. Alternatively, the signal $e_{out}$ may be limited to remove the picture information and provide the interference pattern only which can be used by an automatic display device 52 to provide automatic recognition of defects in the object 41.

In the system of FIG. 5, is desirable to make the interference frequency, $\sin\alpha/\lambda$, at the edge of the storage camera resolution so that the video bandwidth of the envelope can be as wide as possible for maximum resolution. The envelope detector can be aided by first heterodyning the signal to a high frequency and then filtering one sideband. In this way the output frequencies of the envelope detector are much smaller than the input frequencies, thus minimizing the filtering requirements for good resolution.

The purpose of the small angular offset frequency, within the resolution capability of the storage tube, is to provide a carrier which is amplitude modulated with the amplitude of the light from the object and phase modulated with the phase of the light from the object. This carrier then allows for subsequent envelope detection. It also provides some assistance in separating the interference terms from the $a^2$ term if the cancellation or subtraction process is inexact.

The arrangement of FIG. 5 produced an output showing the original picture "a" modulated by the interference pattern due to phase variation. It is sometimes sufficient, especially for automatic recognition of defects, to simply produce an output showing only the interference pattern due to phase variation, without the original picture. The arrangement of FIG. 6 is adapted to produce such an output. In FIG. 6, an arrangement is shown which requires no spatial offset of the reference beam and no phase reversal between first and second scans. An object 53 is illuminated with light from a laser 54. The scattered and reflected light from object 53 is imaged by a lens 55 through a beam splitter (half-silvered mirror) 56 on to the face of a storage camera 57. Part of the light from laser 54 is split off by beam splitter 58 to form a reference beam, which is reflected by mirror 59 and beam splitter 56 to arrive on-axis to the storage camera 57. Since there is no spatial offset of the reference beam, the output of the storage camera 57 is given by $$I_1 = 1 + a^2 + 2a\cos\theta_1$$

This signal is coupled through a switch 60 which at this time is in the position shown by the dotted arrow in FIG. 6, to a video recorder 61, where it is recorded. Next, the object 53 is stressed or altered in some specific manner, as discussed before, and a second output from storage camera 57 is given by $$I_2 = 1 + a^2 + 2a\cos\theta_2$$

At this time switch 60 is in the position shown by the solid arrow in FIG. 6 and $I_2$ is coupled to a subtracter 62 along with $I_1$ from video recorder 61. The subtracter 62 subtracts $I_2$ from $I_1$, to yield a signal described by $$I_1 - I_2 = 2a[\cos\theta_1 - \cos\theta_2]$$

Thus when $\theta_1 = \theta_2$ which would occur if there is no phase variation, the output of subtracter 62 is zero. There will only be an output when there is a phase variation. The output is applied to a display 63 which may be a cathode-ray tube viewed by an operator or any appropriate automatic defect recognition apparatus.

In all of the approaches described, both those using image dissectors and those using storage tubes, the two signals to be compared (which have been designated $I_1$ and $I_2$ throughout) can first be applied to frequency multipliers to increase the sensitivity of the system. Thus, if the frequency of the carrier of each compared signal is multiplied by $n$, the fringe density due to the interference would be increased by $n$.

In all of the interferometry systems described thus far, the interference pattern was created at the real image by using a reference wave on the camera faceplate. In FIG. 7, there is shown a real time interferometry system in which the interference pattern is created on the object itself by illuminating it with two plane waves at different angles. The advantages of such a system are simpler geometry, increased percentage modulation of the fringe pattern, and a control over the fringe density versus displacement. Referring now to FIG. 7, an object 64 is illuminated by plane waves 65 and 66 incident respectively at angles $\theta_1$ and $\theta_2$ with the optical axis of a storage camera 67. The two plane waves 65 and 66 are described by plane wave $65 = e^{\,jk[\sin\theta_1 y + \cos\theta_1 z]}$
plane wave $66 = e^{\,jk[-\sin\theta_2 y + \cos\theta_2 z]}$ The quantity $z^1$ shown in FIG. 7 refers to the distance of the surface of object 64 from an arbitrary line RR drawn through the object 64. In other words $z^1$ represents the surface $z(x,y)$. The amplitudes of the reflected light from the surface of object 64 due to the two plane waves are given by $$U_1 = a(x,y,z^1)e^{\,jk[\sin\theta_1 y + \cos\theta_1 z^1]}$$
$$U_2 = a(x,y,z^1)e^{\,jk[-\sin\theta_2 y + \cos\theta_2 z^1]}$$

The resultant intensity $I_1(x,y)$ on the object surface is given by $$I_1(x,y) = U_1 + U_2{}^2 = 2a^2 + 2a^2\cos k[\alpha y + \beta z_1{}^1]$$

where $\alpha = \sin\theta_1 + \sin\theta_2$, $= (\cos\theta_1 - \cos\theta_2)$ and $z_1{}^1$ is the surface state during the first scan.

This intensity $I_1(x,y)$ is imaged by a lens 68 on the face of the storage camera 67. The output of storage camera 67 is connected through a switch 69, which at this time is in a position shown by the dotted arrow in FIG. 7, to a video recorder 70 which stores $I_1$. Next the object 64 is stressed or altered as before and illuminated by plane waves 65 and 66 from lasers 71 and 72, respectively. However, a controlled phase shifter 73, which may, for example, be an electro-optic crystal, is situated in the path of plane wave 66 and applies a 180° phase shift thereto. Then the intensity on the object and the output of the storage camera 67 is described by $$I_2(x,y) = |U_1 - U_2|^2 = 2a^2 - 2a^2\cos k[\alpha y + \beta z_1{}^1]$$

At this time switch 69 is in the position shown by the solid arrow in FIG. 7 and $I_2$ is combined with the previously recorded $I_1$, in a subtracter 74. The subtracter 74 subtracts $I_2$ from $I_1$ to yield $$I_1 - I_2 = 2a^2\,[\cos k(\alpha y + \beta z_1{}^1) + \cos k(\alpha y + \beta z_2{}^1)]$$

The spatial carrier $\alpha$ has really become an electrical carrier $\alpha v$ when scanned by the storage camera 67 with a velocity $v$. The resultant electrical signal on a carrier is envelope detected by an envelope detector 75, providing a signal $$e\text{ envelope} = a^2\,[1 + \cos k\beta(z_1{}^1 - z_2{}^1)]^{1/2}$$
$$= a^2\,(1 + \cos k\beta\Delta z^1)^{1/2}$$
$$= a^2\,(1 + \cos k\beta\Delta z^1)^{1/2}$$

where $\Delta z^1$ is the deformation. This signal is displayed on a suitable display 76, which may be a cathode-ray tube or other display of types well known in the art. It can be seen that the sensitivity of this system is readily controlled by $\beta$, which is the difference of the cosines of the angles of plane waves 65 and 66. This parameter can be controlled between 0 and 1 and can thus control whether it takes one wavelength or many wavelengths of deformation, $\Delta z^1$, to create a fringe in the output pattern.

It can be readily seen that the system of FIG. 7 could be modified by removing the controlled phase shifter 73, which would cause only deformation information to be displayed, without any original picture information. In this case $$I_1 = 2a^2 + 2a^2 \cos k[\alpha y + \beta z_1{}^1]$$
$$I_2 = 2a^2 + 2a^2 \cos k[\alpha y + \beta z_2{}^1]$$

and $I_1{}'I_2 = 2$

Expanding, $I_1 - I_2 + 2a^2 [(\cos k\,\alpha y \cos k\beta z_1{}^1 - \sin k\alpha y \sin k\beta z_1{}^1) - (\cos k\alpha y \cos k\beta z_2{}^1 - \sin k\alpha y \sin k\beta z_2{}^1)]$ $= 2a^2 [\cos k\alpha y (\cos k\beta z_1{}^1 - \cos k\beta z_2{}^1) - \sin k\alpha y (\sin k\beta z_1{}^1 - \sin k\beta z_2{}^1)]$ Thus, in this case if $z_1{}^1 = z_2{}^1$ which would mean that there was no deformation or defect in the object under examination, no output would be produced. Rather, there would be only an output when there are existing fringe areas representative of a defect.

This method of creating the interference pattern on the object itself can also be used with the image dissector arrangements shown in FIGS. 1 and 2. In this case the phase shifter 73 in FIG. 7 would become a frequency shifter as was 19 in FIG. 1. The entire camera and subsequent processing of FIG. 7 can be replaced by that of FIGS. 1 and 2. Here again, the advantage of this latter method would be the control of the sensitivity of the resultant fringe pattern to deformations. The use of the relatively light insensitive image dissector compared to the storage camera tube would, however, necessitate the use of significantly more powerful light sources.

While particular embodiments of the invention have been shown and described, it will of course be understood that the invention is not limited thereto since many modifications in the circuits, optical arrangements, and in the instrumentalities employed may be made. It is contemplated that the appended claims will cover any such modifications as fall within the true spirit and scope of the invention.

What is claimed is:

1. Apparatus for measuring small dimensional changes in an object by real time hologram interferometry comprising:
   a. means for sequentially illuminating an object in first and second states sequentially to form first and second scattered and reflected object beams respectively;
   b. means for generating a reference light beam;
   c. a television camera tube having a visual input and adapted to produce an electrical output;
   d. means for sequentially combining said first scattered and reflected object beam with said reference light beam and said second scattered and reflected object beam with said reference light beam to form individual first and second interference patterns respectively which are received by said television camera tube as a visual input;
   e. means for storing the first electrical output of said television camera tube corresponding to said first interference pattern;
   f. means for combining the second electrical output of said television camera tube corresponding to said second interference pattern with the stored electrical output of said television camera tube corresponding to said first interference pattern to form a signal containing position deformation information of the first and second states of the object; and
   g. means for utilizing said signal containing position deformation information.

2. Apparatus as described in claim 1 including restricting means for restricting the spatial frequency spectra of said first and second interference patterns to that of the television camera tube.

3. Apparatus as described in claim 2 in which said restricting means comprises a light frequency shifter inserted in the path of said reference light beam to provide a cyclical temporal offset of the phase of said reference light beam.

4. Apparatus as described in claim 1 including means for providing angular offset of said reference light beam with respect to the axis of said scattered and reflected object beam to allow the use of a storage-type television camera tube.

5. Apparatus as described in claim 3 including a filter for removing unwanted components from the first and second electrical outputs of said television camera tube to form first and second filtered electrical outputs.

6. Apparatus as described in claim 3 in which said means for utilizing said signal containing position deformation information comprises a limiter for removing original picture information and a spectrum analyzer for analyzing the remaining position deformation information.

7. Apparatus as described in claim 5 including envelope detecting means for envelope detecting said signal containing position deformation information.

8. Apparatus as described in claim 7 including a cathode-ray tube for displaying the output of said envelope detecting means.

9. Apparatus as described in claim 5 including means for separating said first and second filtered electrical outputs into real and imaginary positions.

10. Apparatus as described in claim 5 including means for synchronizing the second electrical output of said television camera tube to the stored first electrical output of said television camera tube.

11. Apparatus as described in claim 9 including means for combining the real and imaginary parts of said first and second filtered electrical outputs to form said signal containing position deformation information.

12. Apparatus for measuring small dimensional changes in an object by real time hologram interferometry comprising:
   a. means for sequentially illuminating an object in first and second states sequentially to form first and second scattered and reflected object beams respectively;
   b. means for generating a reference light beam;
   c. a storage television camera tube having a visual input and adapted to convert visual information to an electrical output;
   d. means for sequentially combining said first scattered and reflected object beam with said reference light beam and said second scattered and reflected object beam with said reference light beam to form first and second individual interference patterns respectively, said reference light beam disposed at an angle with respect to both said first scattered and reflected object beam and to said second scattered and reflected object beam in order to eliminate undesired patterns by making their spatial frequencies beyond the capabilities of said storage television camera tube; and said first and second interference patterns each stored as a visual input by said storage television camera tube;
   e. means for scanning said storage television camera tube to produce an output signal; and
   f. inspecting means for inspecting said output signal to derive position deformation information about the object therefrom.

13. Apparatus as described in claim 12 in which said inspecting means comprises a cathode-ray tube adapted to be viewed by an operator.

14. Apparatus as described in claim 12 in which said inspecting means comprises a limiter for removing original picture information from said output signal and a spectrum analyzer for analyzing the remaining position deformation information in said output signal.

15. Apparatus for measuring small dimensional changes in an object by real time hologram interferometry comprising:
   a. means for sequentially illuminating an object in first and second states sequentially to form first and second scattered and reflected object beams respectively;
   b. means for generating a reference light beam;
   c. a storage television camera tube having a visual input and adapted to convert visual information to an electrical output;
   d. means for sequentially combining said first and second scattered and reflected object beams with said reference light beam sequentially to form first and second interference patterns, said reference light beam disposed at an angle object beam with respect to said first scattered and reflected object beam and to said second scattered and reflected in order to separate the interference information from that of the images;

e. said storage television tube camera having a first electrical output corresponding to said first interference pattern and means for storing said first electrical output;
f. said storage television tube camera having a second electrical output corresponding to said second interference pattern;
g. means for combining said first and said second electrical outputs to form a signal-containing position deformation information; and
h. means for utilizing said signal-containing position deformation information.

16. Apparatus as described in claim 15 in which said means for combining said first and said second electrical outputs comprises a subtracter having an output.

17. Apparatus as described in claim 16 including an envelope detector for detecting said envelope of said subtracter to form said signal-containing position deformation information;

18. Apparatus as described in claim 17 including a controlled phase shifter disposed in the path of said reference light beam for shifting the phase of said reference light beam 180° between said first and said second interference patterns.

19. Apparatus as described in claim 1 in which said television camera tube is a storage tube and in which said means for combining the second electrical output of said television camera tube corresponding to said second interference pattern with the stored first electrical output of said television camera tube corresponding to said first interference pattern comprises a subtracter which produces said signal-containing position deformation information only when there is position deformation in the object between said first and said second interference pattern.

20. Apparatus for measuring small dimensional changes in an object by real time hologram interferometry comprising:
a. a television camera tube spaced from the object and having an optical axis, said camera having a visual input and an electrical output;
b. means for sequentially illuminating the object in first and second states both first and second plane waves incident on the object at angles $\theta_1$ and $\theta_2$ respectively, with respect to said optical axis of said television camera tube, whereby said first and second plane waves form a first interference pattern on said object in the first state, and a second interference pattern on said object in the second state;
c. means for sequentially imaging said first and second interference patterns on said visual input of said television camera tube to form first and second electrical output respectively;
d. storage means for storing said first electrical output;
e. combining means for combining said second electrical output with said first electrical output from said storage means to form a combined output;
f. detecting means for detecting said combined output to form a detected output; and
g. means for utilizing said detected output.

21. Apparatus according to claim 20 where said television camera is a storage television camera.

22. Apparatus according to claim 20 in which said combining means comprises a subtracter for subtracting said second electrical output from said first electrical output.

23. Apparatus according to claim 20 including a light frequency shifter situated in the path of said second plane wave to provide a cyclical temporal offset of the phase of said reference light beam.

24. Apparatus as described in claim 23 including a filter for removing unwanted components from the first and second electrical outputs of said television camera to form first and second filtered electrical outputs.

25. Apparatus as described in claim 24 including envelope-detecting means for envelope detecting said signal-containing position deformation information.

26. Apparatus according to claim 22 in which said detecting means comprises an envelope detector for detecting said combined output, said combined output only being present when there is a position deformity in the object between said first and second interference patterns.

27. Apparatus according to claim 22 including a controlled phase shifter situated in the path of said second plane wave for shifting the phase of said second plane wave 180° between said first and second interference patterns.

28. Apparatus according to claim 27 in which said detecting means comprises an envelope detector for detecting said combined output, said combined output containing picture information of the object with said picture information modulated by position deformation information pertaining to position deformation in the object between said first and second interference patterns.

* * * * *